US008500886B2

(12) United States Patent
Okano et al.

(10) Patent No.: US 8,500,886 B2
(45) Date of Patent: Aug. 6, 2013

(54) APPARATUS FOR REMOVING CARBON DIOXIDE FROM A GAS

(75) Inventors: Hiroshi Okano, Fukuoka (JP); Tsutomu Hirose, Fukuoka (JP)

(73) Assignee: Seibu Giken Co, Ltd, Fukuoka (JP)

( * ) Notice: Subject to any disclaimer, the term of this patent is extended or adjusted under 35 U.S.C. 154(b) by 78 days.

(21) Appl. No.: 13/067,677

(22) Filed: Jun. 20, 2011

(65) Prior Publication Data

US 2012/0000365 A1 Jan. 5, 2012

(30) Foreign Application Priority Data

Jun. 24, 2010 (JP) .................................. 2010-143333

(51) Int. Cl.
*B01D 53/02* (2006.01)
(52) U.S. Cl.
USPC .................. 96/144; 96/123; 96/143; 96/146; 96/150; 95/113; 95/117; 95/123; 95/139
(58) Field of Classification Search
USPC .............. 95/113, 117, 123, 139; 96/125, 143, 96/144, 146, 150
See application file for complete search history.

(56) References Cited

U.S. PATENT DOCUMENTS

| | | | | |
|---|---|---|---|---|
| 4,948,392 A | * | 8/1990 | Rush | 95/113 |
| 5,167,679 A | * | 12/1992 | Maekawa et al. | 96/125 |
| 5,170,633 A | * | 12/1992 | Kaplan | 62/94 |
| 5,702,505 A | * | 12/1997 | Izumi et al. | 95/115 |
| 6,500,236 B2 | * | 12/2002 | Suzuki et al. | 95/113 |
| 7,166,149 B2 | * | 1/2007 | Dunne et al. | 95/113 |
| 2005/0217481 A1 | * | 10/2005 | Dunne et al. | 95/113 |
| 2006/0182680 A1 | * | 8/2006 | Keefer et al. | 423/651 |
| 2011/0289955 A1 | * | 12/2011 | Okano | 62/271 |

* cited by examiner

*Primary Examiner* — Christopher P Jones
(74) *Attorney, Agent, or Firm* — Staas & Halsey LLP

(57) ABSTRACT

Exhaust gas after coal or oil burning has moisture, which hinders carbon dioxide adsorption. It is necessary to completely remove this moisture with the minimum use of energy. The exhaust gas from the burning apparatus is first lowered of its temperature by passing through an total heat exchanger rotor, and the resultant gas which has low temperature and humidity is sent to a carbon dioxide adsorption rotor, thereby removing carbon dioxide from the gas, which is then sent through the total heat exchanger rotor with the resultant desorption of moisture adsorbed there and is exhausted to outside atmosphere, while the carbon dioxide adsorption rotor is desorbed of its carbon dioxide using water vapor, with the resultant very humid carbon dioxide to be sent to a processing system such as for underground burial.

4 Claims, 5 Drawing Sheets

APPARATUS FOR REMOVING CARBON DIOXIDE FROM A GAS

CROSS REFERENCE TO RELATED APPLICATIONS

This application is based on and hereby claims priority to Japanese Patent Application No. JP 2010-143333 filed on Jun. 24, 2010, the contents of which are hereby incorporated by reference.

BACKGROUND

This invention is concerned with an apparatus to remove carbon dioxide from exhaust gas from thermal power plant efficiently with minimum energy.

There have been strenuous efforts worldwide to reduce carbon dioxide emission from industry and household, in order to cope with global warming. For this purpose, energy-consuming equipments are being developed to make them as energy efficient as possible, so as to be replaced with older models. Also, in the electricity generation, such renewable sources as solar power or wind power have been vigorously pursued, the generation efficiency of conventional fossil-fuel burning power plants has been tried to be improved, and techniques of carbon capture and storage (CCS) of exhausted carbon dioxide from fossil-fuel burning power plants to underground or ocean have been developed.

Among the items described above, the present invention is concerned with the techniques of carbon capture and storage (CCS) of exhausted carbon dioxide from fossil-fuel burning power plants to underground or ocean.

Among thermal power plant, oil, natural gas and coal are the most widely used fuels, and exhausts from urban areas are also burned. Among these, coal-burning power plants have the following features; the fuel is cheap and its world reserve is much larger than oil, and distributed rather evenly all over the world, resulting in easy access and thus stable supply of electricity.

However, carbon dioxide emission per power output for coal is larger than that for oil and natural gas, and emission of sulfurate gas is also larger. In addition, heavier components of oil have similar problems. Due to these reasons, power plants using coal and heavier components of oil have equipped with apparatus for removing sulfur oxides and nitric oxides in order to alleviate environmental pollution.

Even after removal of sulfur oxides and nitric oxides, carbon dioxide is emitted in large quantity, resulting in becoming the cause of global warming.

In order to cope with this, a technique of separating (capturing) carbon dioxide from the exhaust gas, and storing it into underground or ocean (carbon capture and storage, CCS) is vigorously pursued. For this purpose, a number of proposals have been put forward for separating carbon dioxide, and one of them is to use adsorbing agents of carbon dioxide. For this case, there is a problem of moisture in the exhaust gas which prevents the adsorption process of carbon dioxide.

In other words, exhaust gas contains moisture which results from chemical reactions of hydrogen molecules in the fuel, nitric and sulfur oxides which result from chemical reactions of nitrogen and sulfur, all with oxygen molecules in air during the burning process. While nitric oxides are dissociated by catalytic actions at the ammonia contact reduction method and sulfur oxides are removed by using the wet caustic lime in which fluids containing caustic lime are sprayed into the exhaust gas.

For this reason, it is apparent of the problem caused by the presence of a large amount of moisture in the exhaust gas which prevents the adsorption process of carbon dioxide by adsorbing agents such as zeolite. In order to cope with this, a technique of removing moisture from the exhaust gas has been developed, as disclosed in the patent document 1.

[Precedents]
[Patent Documents]
[Patent Document 1] Japan 2009-242160
[Patent Document 2] Japan 2004-344703

SUMMARY

The exhaust gas after burning coal or oil contains moisture, which prevents the adsorption process of carbon dioxide to adsorp medium. It is necessary to completely remove this moisture with minimum of energy use. For this purpose, the exhaust gas from burners is first sent through a total heat exchanger rotor to lower its temperature and humidity, which is then passed through a rotor for adsorbing carbon dioxide. Then, the gas containing less carbon dioxide is passed through the total heat exchanger to desorb moisture there, while the carbon dioxide in the rotor for the carbon dioxide desorption is desorbed using water vapor. The resulting carbon dioxide containing a large amount of moisture is finally sent to a storage process plant in deep underground or ocean.

The patent document 1 is concerned with separating carbon dioxide from exhaust gas emitted from thermal power plants and others, in which moisture from the exhaust gas is first removed. By this process, the separation of carbon dioxide can be carried out efficiently. What the present invention intend to resolve is the problem of consuming much energy for the moisture removal process. Namely, if the process of trying to avoid global warming consumes energy, it cannot be said to be a good idea.

In the present invention, the temperature and humidity of the exhaust gas from burners are first lowered by passing through a total heat exchanger, and the exhaust gas having thus lowered temperature and humidity is sent to a rotor having a capability of adsorbing carbon dioxide. The gas after removal of carbon dioxide is passed through another section of the total heat exchanger to desorb adsorbed moisture there, which is then exhausted into the outside atmosphere. The main feature of the present invention is that the carbon dioxide adsorbed in the rotor having a capability of adsorbing carbon dioxide is desorbed in the desorption zone using water vapor, and the resultant carbon dioxide having a large amount of moisture is sent to a processing plant for storing it in underground or ocean.

In the present invention of carbon dioxide capture, moisture in the exhaust gas is removed using an total heat exchanger, and the adsorbed moisture in the total heat exchanger is desorbed using the exhaust gas after removal of carbon dioxide. In this way, this system has a clear advantage of no energy consumption being involved in the moisture removal process.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
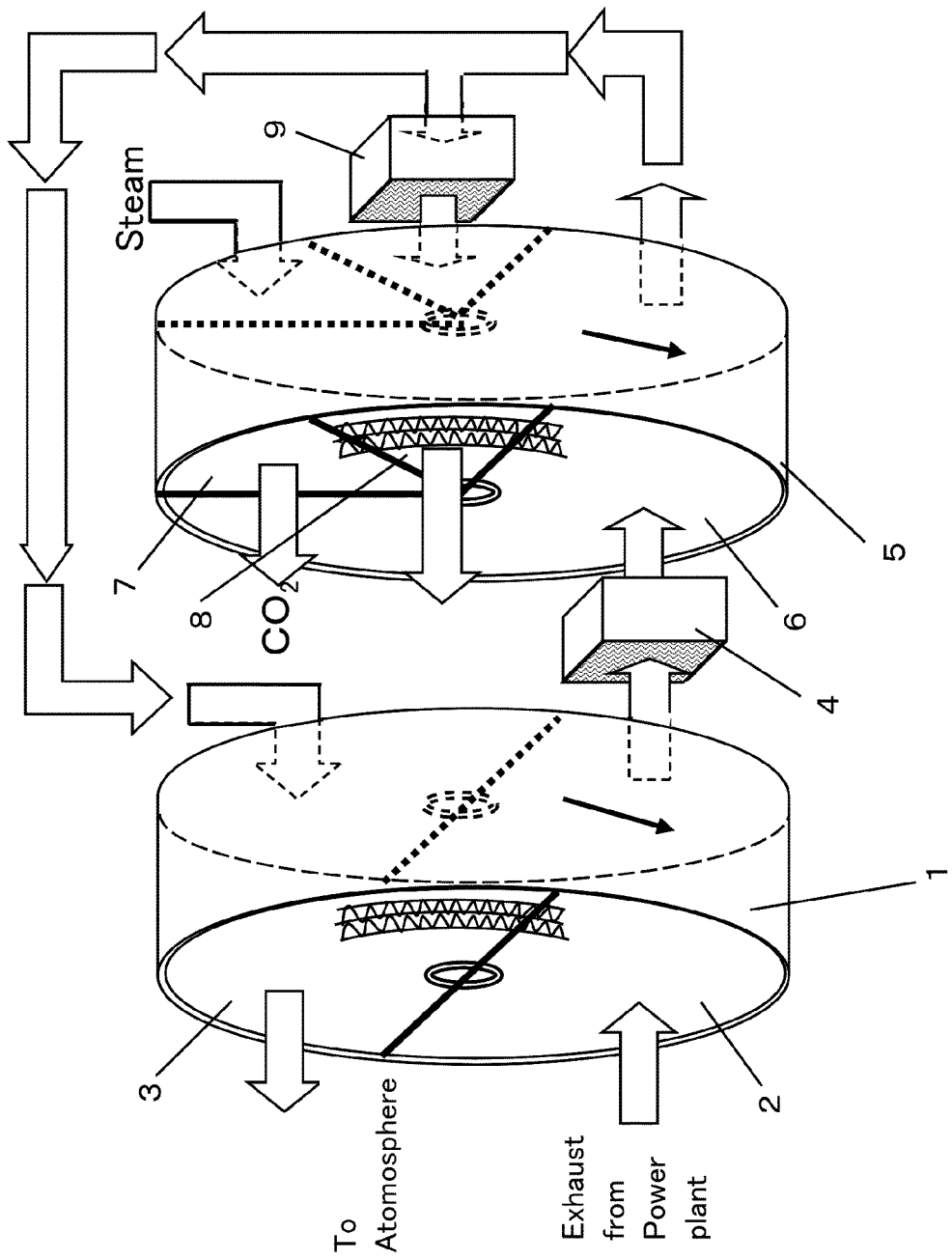
FIG. 1 shows a gas flow in the first embodiment of the invention.

Reference will now be made in detail to the preferred embodiments of the present invention, examples of which are illustrated in the accompanying drawings, wherein like reference numerals refer to like elements throughout.

The purpose of the present invention is to remove moisture in the exhaust gas of a burner, by which the removal efficiency of carbon dioxide is drastically improved, and the main feature is the removal of moisture being carried out without energy use. In order to realize this, the exhaust gas of the burner is first passed through a total heat exchanger to lower its temperature and humidity, and the resultant gas is its carbon dioxide being removed by passing through a rotor having a capability of adsorbing carbon dioxide. The gas after the carbon dioxide removal is fed to another section of the total heat exchanger to desorb moisture there, and is exhausted into the outside atmosphere. The carbon dioxide adsorbed in the $CO_2$ adsorbing rotor is desorbed in the regeneration section using water vapor, and the resultant carbon dioxide containing a large amount of moisture is sent to the final storage plant into underground or ocean.

[First Embodiment]

FIG. 1 shows the flow diagram of the proposed apparatus of carbon dioxide removal. Regarding the total heat exchanger 1, there are many types of commercial products, and the most suitable one is that disclosed in the Japanese Patent No. 3009018. Here, an aluminum sheet is shaped in a honeycomb structure, on which moisture adsorbing agents are wash-coated, and is finally made in a rotor-shape so that it is rotatable. As for the moisture adsorbing agents, a specially chosen ion exchange resin, as disclosed in the Japanese Patent No. 3009018, is suitable after it is crush-formed, but is not necessarily limited to this choice. In the present embodiment of application, an total heat exchanger with a width of 400 mm was used.

As shown in FIG. 1, this total heat exchanger is subdivided into two sections, each having the zone area ratio of 1:1. Namely, the one section is the adsorption zone 2, with another the desorption zone 3, which is rotated using a motor (not shown in the figure, because it is a conventional one), with the gas passing through the adsorption zone 2 and that passing through the desorption zone 3 are both of their humidity (latent heat) and temperature (sensible heat) exchanged. The ratio of the amounts of gas passing through the adsorption zone 2 and that passing through the desorption zone 3 may be 1:1, but the amount of that passing through the desorption zone 3 may be increased by introducing outside air, thus enhancing the actions of cooling and dehumidification for the adsorption zone. In the adsorption zone 2, an exhaust gas from, for example, coal-fired thermal power plant is supplied. In this way, moisture in the exhaust gas is removed, together with its temperature being lowered. The efficiency of this total heat exchanger is, for the case of gas ratio of 1:2, 90%.

The gas which passed through the adsorption zone 2 of the total heat exchanger 1 is cooled by a cooling coil 4. In the cooling coil 4 is flown a non-freeze solution cooled in a refrigerator, by which action the gas flowing there is cooled together with the temperature of the non-freeze solution being raised. In other words, the cooling coil is a heat exchanger, which works between the gas and the non-freeze solution to exchange their sensible heats.

The carbon dioxide adsorbing rotor 5 is first formed in a honeycomb structure using a sheet, on which a carbon dioxide adsorbing agent is wash-coated, which is finally made into a cylindrical shape so as to be rotatable. As the carbon dioxide adsorbing agent, synthetic zeolite is used. Otherwise, silica gel or active alumina may be usable.

The carbon dioxide adsorbing agent 5 is subdivided into three sections, namely an adsorbing section 6, a desorbing section 7 and a purge zone 8. In the adsorbing zone 6 is passed the gas which was cooled by the cooling coil 4. Namely, the gas passing through this adsorption zone 6 was previously dried by being dehumidified by passing through the total heat exchanger 1, and cooled by the cooling coil 4.

In passing through the adsorption zone 6, carbon dioxide contained in the gas is adsorbed in the carbon dioxide adsorbing rotor 5, and the remaining gas mostly consisted of nitrogen and oxygen is discharged to the outside atmosphere.

A part of the gas emitted from the carbon dioxide adsorbing rotor 5 is cooled by a heat exchanger 9, and sent to the purge zone 8, thereby cooling the carbon dioxide adsorbing rotor 5. The gas which passed through the purge zone is discharged to the outside atmosphere.

The remainder of the gas emitted from the carbon dioxide adsorbing rotor 5 is sent to the desorption zone 3 of the total heat exchanger 1, thus desorbing the adsorbed moisture there and finally being discharged to the outside atmosphere.

The carbon dioxide adsorbing rotor 5 rotates through a desorption zone 7. Steam from a boiler is sent through the desorption zone 7. This forces the release (desorption) of adsorbed carbon dioxide.

The condensed carbon dioxide gas emitted from the desorption zone 7 is injected into deep ocean, dried oil-fields or underground waterbearing stratum, thus enabling the amount of carbon dioxide emitted to atmosphere being reduced.

In the above embodiment of application 1, exhaust gas from thermal power plant is first dehumidified by passing through the total heat exchanger rotor 1, and then is sent to the carbon dioxide adsorbing rotor 5. In this way, the amount of moisture which is adsorbed in the carbon dioxide adsorbing rotor 5 is small, resulting in less required energy for the carbon dioxide desorption. In other words, if moisture is adsorbed in the carbon dioxide adsorbing rotor 5, energy is consumed for desorbing the moisture, thus wasting energy there.

Furthermore, no energy is needed to be supplied for dehumidifying the total heat exchanger 1, thus enabling energy saving as a whole system. In addition, moisture is not adsorbed in the carbon dioxide adsorbing rotor 5, the amount of adsorbed carbon dioxide there becomes large.

[Second Embodiment]

Figure 2:
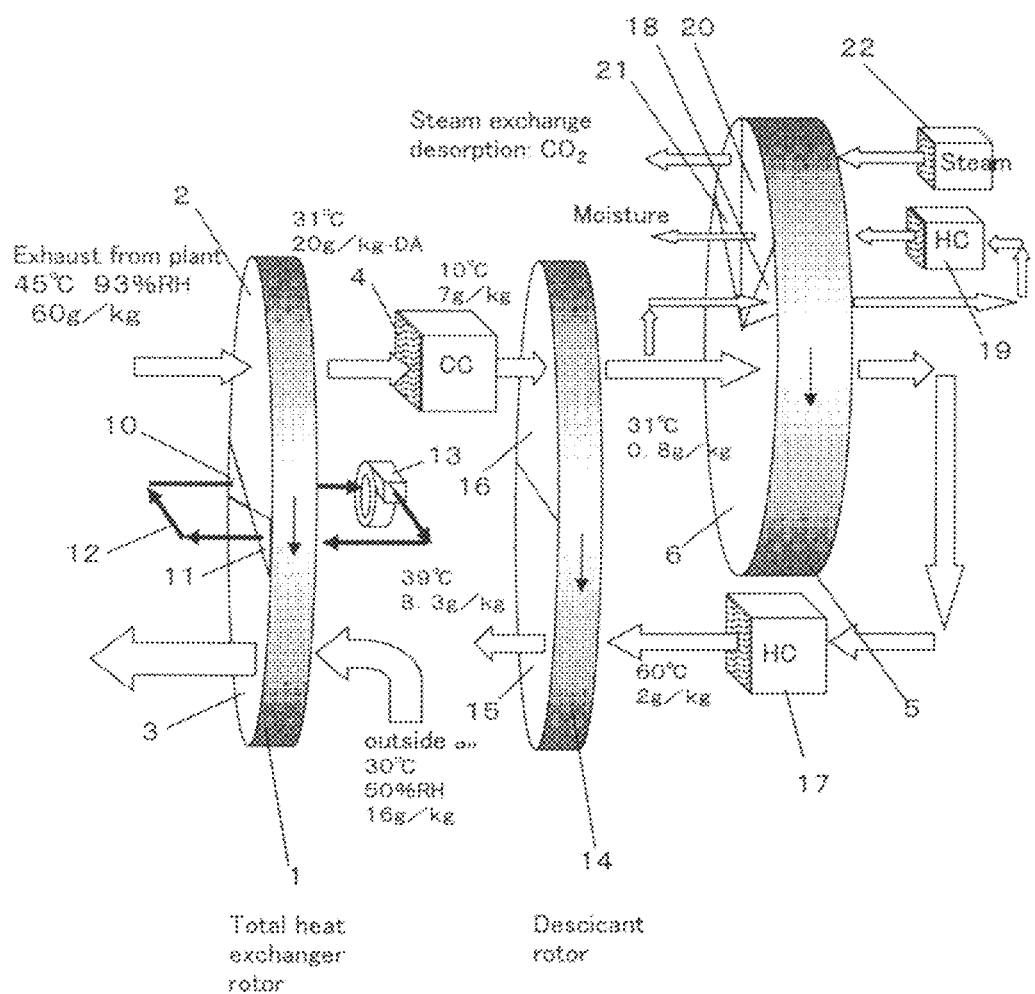
FIG. 2 shows a gas flow in second embodiment of the invention.

The second embodiment of application of the present invention is shown in FIG. 2. Here, the same components as those in FIG. 1 are given the same numbers. The total heat exchanger rotor 1 is equipped with two purge zones 11 and 12, between which is connected circularly by a piping duct 12.

The piping duct 12 is installed with a blower for circulating air in it. Incidentally, the adsorption zone 2 and the desorption zone 3 of the total heat exchanger 1 in FIG. 2 are shown upside down from those shown in FIG. 1, but their functions are the same.

The gas after passing through the adsorption zone 2 of the total heat exchanger 1 is cooled by a cooling coil 4. The cooling coil is cooled by passing non freeze solution which is previously cooled by a refrigerator, and the coil cools the gas passing outside of the coil and at the same time warms the non freeze solution passing inside the coil. Namely, the cooling coil is the sensible heat exchanger operating between the gas and the non freeze solution.

The low temperature reactivation rotor 14 is wash-coated with silica gel or synthetic zeolite, or alternatively a synthetic adsorbing agent as disclosed in the International Patent Document 2005/090417, and is subdivided into two zones of a desorption zone 15 and an adsorption zone 16. The gas after passing through the cooling coil 4 is arranged to go through the adsorption zone 16.

The gas which passed through the adsorption zone 16 of the low temperature reactivation rotor 14 is sent to the adsorption zone 6 of the carbon dioxide adsorption rotor 5, and then is heated by the heater 17 to be sent to the desorption zone 15 of the low temperature reactivation rotor 14. The gas after passing through the desorption zone 15 of the low temperature reactivation rotor 14 is exhausted into outside atmosphere.

The gas which passed through the desorption zone 14 of the low temperature reactivation rotor 14 is partially diverted to be sent to the purge zone 18 of the carbon dioxide adsorption rotor 5, and then to the heater 19. This is followed by passage through the second desorption zone 20 of the carbon dioxide adsorption rotor 5, which is finally exhausted to outside atmosphere.

Through the first desorption zone 21 of the carbon dioxide adsorption rotor 5 is sent the water vapor from the water vapor generator 22. The water vapor and the gas which exit from the first desorption zone 21 are sent to underground for burial there.

In the following, it is described how this embodiment of the second application of this invention works. Exhaust gas from thermal power plants contains moisture resulting from burning hydrogen in fuels such as coal and oil, in addition to carbon dioxide. During the passage of this exhaust gas through the adsorption zone 2 of the rotor 1 of the total heat exchanger, a portion of the moisture in the exhaust gas is adsorbed in the rotor 1. Then, the moisture adsorbed in the rotor is desorbed during the passage of the desorption zone 3.

In addition, the rotor 1 of the total heat exchanger is equipped with a pair of the purge zones 10 and 11, between which air is circulated by a circulating blower 13. If we focus our attention to one portion of the rotor 1 of the total heat exchanger, when this portion finishes passing through the adsorption zone, the honeycomb structure of this portion of the rotor 1 of the total heat exchanger still contains some residual gas of the exhaust gas. This residual gas is emitted at the purge zone 11 by the circulating air, and move to the purge zone 10. Upon completing the passage through the purge zone 10, this residual gas in the honeycomb structure goes out from the adsorption zone 2, together with the gas sent from thermal power plants. In this way, by the actions of the pair of purge zones 10 and 11 together with the circulating action of the pipe between them, the exhaust gas from thermal power plants goes to the desorption zone 3 during the total heat exchange, with the result of its much reduced discharge into atmosphere.

For the removal of moisture contained in the exhaust gas by the action of the rotor 1 of the total heat exchanger, no energy is required other than that for the blower (not shown in the figure) to send the outside air, and that used to circulate air by the circulating blower 13 between the purge zones 10 and 11. As a result of an experiment, the temperature of the exhaust gas from a thermal power plant was 45° C. and the absolute humidity was 60 g/kg, and the gas emitted from the adsorption zone had the following respective values; 31° C. and 20 g/kg.

The gas after passage through the adsorption zone 2 is cooled in the cooling coil, with its temperature reduced further by dew formation, resulting in the exit values of 10° C. and 7 g/kg, respectively. This low-temperature dry air is sent to the adsorption zone 16 of the low-temperature regeneration dehumidifying rotor 14, resulting in higher temperature due to desorption heat with even drier gas. The measured values at the exit of the desorption zone 16 had the following respective values: 31° C. and 0.8 g/kg.

The gas after passage through the desorption zone 16 of the low-temperature regeneration dehumidifying rotor 14 enters the adsorption zone 6 of the carbon dioxide adsorption rotor 5, resulting in the desorption of carbon dioxide together with minutely remaining moisture. The amount of moisture in the gas is extremely small, which does not hinder adsorption of carbon dioxide, as such carbon dioxide is efficiently adsorbed in the carbon dioxide adsorption rotor 5. Because the carbon dioxide adsorption rotor 5 contains some moisture resulting from the vapor desorption process described later, the gas after passage through the adsorption zone is somewhat humidified, with the result of the absolute humidity of 2 g/kg.

The main constituents of the gas after passage through the adsorption zone 6 of the carbon dioxide adsorption rotor 5 are, because of the removal of carbon dioxide, nitrogen and rarefied oxygen. This gas is heated to 60° C. using the heater 17.

The gas which is heated to 60° C. using the heater 17 passes through the desorption zone 15 of the low-temperature regeneration dehumidifier 14, thereby desorbing the adsorbed moisture in the low-temperature regeneration dehumidifier 14. The temperature of the gas after passage through the desorption zone 15 of the low-temperature regeneration dehumidifier 14 is lowered to 39° C. with the absolute humidity of 8.3 g/kg. As mentioned above, carbon dioxide of this gas has been already removed, and the gas is discharged to atmosphere.

In the first desorption zone 21 of the carbon dioxide rotor 5 is sent water vapor from the water vapor generator 22. By this process, carbon dioxide adsorbed in the carbon dioxide adsorbing rotor 5 and moisture are exchanged. In other words, if the adsorbing agent of the carbon dioxide rotor 5 has a stronger adsorbing effect for moisture than carbon dioxide, adsorption of moisture expels the already adsorbed carbon dioxide there.

If silica gel or synthetic zeolite is used as the adsorbing agent of the carbon dioxide rotor 5, their adsorbing effects are stronger for moisture than for carbon dioxide, resulting in the above-mentioned phenomenon to occur.

A portion of the gas, which passed through the adsorption zone 16 of the low-temperature regeneration dehumidifier 14, is divided and sent through the purge zone 18 of the carbon dioxide adsorbing rotor 5, thereby cooling the carbon dioxide adsorbing rotor 5. The gas after passage through the purge zone 18 is its temperature raised, and is further heated by the heater 19, which is then sent to the second desorption zone 20 of the carbon dioxide adsorbing rotor 5, thereby desorbing moisture adsorbed in the carbon dioxide adsorbing rotor 5 by the water vapor desorption process. The gas after passage through the second adsorption zone 20 is discharged to atmosphere. In this way, the gas after passage through the carbon dioxide adsorbing rotor 5 goes through the purge zone 18 and then to the adsorption zone 6 after moisture desorption. Namely, the carbon dioxide adsorbing rotor 5 is in the dry condition at the adsorption zone 6, with the resulting strong adsorption effect of carbon dioxide.

As explained above, this embodiment of application of the present invention ensures densification of carbon dioxide with a minimum use of energy, thus enabling effective densification of carbon dioxide for exhaust gas from such sites as thermal power plants or steel production plants where a large amount of carbon dioxide is exhausted for storage in underground or in ocean.

[Third Embodiment]

Figure 3:
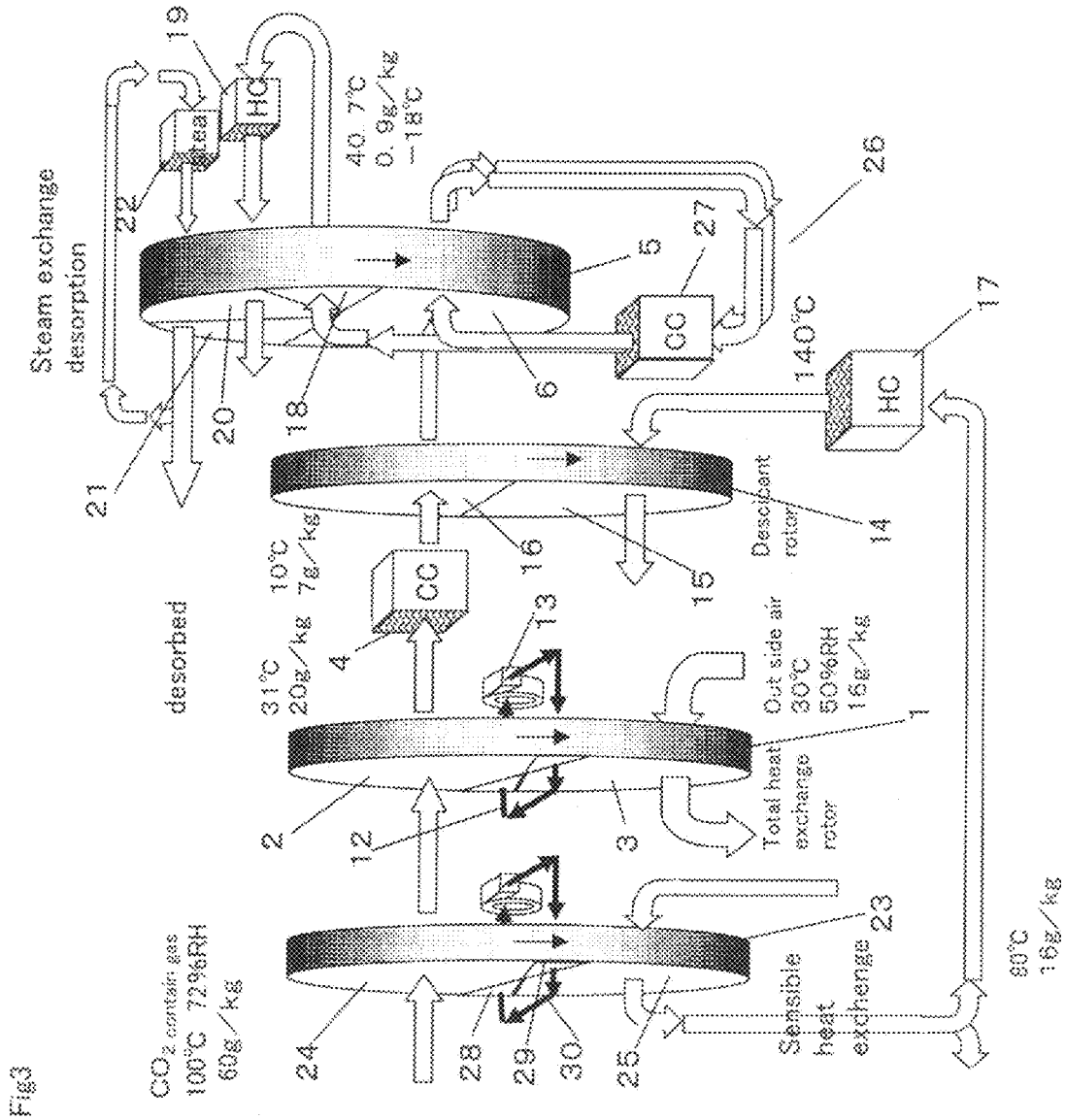
FIG. 3 shows a gas flow in third embodiment of the invention.

The third embodiment of application of the present invention is shown in FIG. 3. In this figure, the same components as those in FIG. 1 for the first embodiment of application and those in FIG. 2 for the second embodiment of application are given the same numbers. Compared with the second embodiment of application, this third embodiment is added with the sensible heat exchanger 23. In addition, in this third embodiment is installed the circulating circuit 26 so that the gas containing carbon dioxide circulates twice in the adsorption zone 6 of the carbon dioxide adsorption rotor 5, during which circulation this gas is cooled using the added cooling coil 27. Then, after passage through the adsorption zone 6 twice, this gas is sent to the purge zone 18.

The sensible heat exchanger 23 does not have dehumidifying agent, which is different from total heat exchangers, and is produced by first forming a honeycomb structure made of aluminum sheet and then shaped in a cylindrical configuration so as to be rotatable. The sensible heat exchanger 23 has the heat absorption zone 24 and the heat expulsion zone 25, with the heat absorption zone 24 absorbing sensible heat from the gas passing through it and giving the sensible heat to the gas passing through the heat expulsion zone 25.

In addition, the sensible heat exchanger 23 is equipped with the two purge zones 28 and 29 similarly as for the total heat exchanger rotor 1, with the two purge zones 28 and 29 being connected circularly by the duct 30. The circulating blower 13 installed in the duct 30 and two purge zones 28 and 29 circulates air in them. For this reason, if we focus our attention to a particular point in the sensible heat exchanger 23, when this point finishes passing through the heat-absorption zone 24, the honeycomb structure of the sensible heat exchanger 23 contains remaining gas. This remaining gas is expelled by the circulating air in the purge zone 28, and is moved to the purge zone 29. Upon finishing to go through the purge zone 29, the remaining gas goes out from the heat-absorbing zone 24, together with the gas sent from thermal power plants. In this way, by the actions of a pair of the purge zones 28 and 29 together with the circulating duct 39, the gas exhausted from thermal power plants goes to the heat-expulsion zone 25 during the sensible heat exchange, resulting in a very small amount of gas to be exhausted into atmosphere.

The arrangement of the third embodiment of application of the present invention is as described above, and its action is described in the following. Temperature of exhaust gas from thermal power plants is higher than that of the atmosphere. Because action of adsorbing agents is the higher as gas temperature is the lower, it is necessary to lower temperature upon removal of moisture. If a cooling unit is used for lowering temperature, much energy is consumed there. Therefore, a sensible heat exchanger 23 is employed to exchange sensible heat between the exhaust gas from thermal power plants and the outside atmosphere in this third embodiment of application.

By this process, temperature of the exhaust gas from thermal power plants is lowered. During this heat exchange process, because of the presence of two purge zones 28 and 29 together with circularly connected duct 30 between them, the exhaust gas from thermal power plant moves to the heat expulsion zone 25, resulting in much reduced amount of gas being released to outside atmosphere.

Then, the exhaust gas from thermal power plants enters into the total heat exchanger rotor 1, thereby exchanging heat with the outside atmosphere with resultant lowering of temperature and humidity. For embodiment, if the outside atmosphere has a temperature of 30° C. and an absolute humidity of 16 g/kg, the exhaust gas from thermal power plants of the exhaust gas becomes to, respectively, 31° C. and 20 g/kg as the result of the total heat exchange. The total heat exchanger rotor 1 is equipped with a pair of the purge zones 10 and 11, with both being circularly connected by the circulating blower 13. Because of the presence of these components and their actions, the exhaust gas from thermal power plants goes to the desorption zone 3 during the total heat exchange, with the result of much reduced amount of gas released to outside atmosphere.

The gas having thus lowered temperature and humidity is further lowered in these values by passing through the cooling coil 4. As an embodiment, the gas after passage of the cooling coil 4 has a temperature of 10° C. and an absolute humidity of 7 g/kg, which then goes to the adsorption zone 16 of the low temperature regeneration dehumidifying rotor 14. By the passage of this adsorption zone 16, the gas becomes a dry condition having, for example, temperature of 40.7° C. and an absolute humidity of 0.9 g/kg. The reason for having higher temperature here is due to the adsorption heat. The outside air which is heated to 80° C. by the passage through the heat expulsion zone 25 of the sensible heat exchanger rotor 23 is further heated to, for example, 140° C. by the heater 17, and sent to the desorption zone 15 of the low temperature regeneration dehumidifying rotor 14. By this process, moisture adsorbed in the low temperature regeneration dehumidifying rotor 14 is desorbed.

After passage through the adsorption zone 16 of the low temperature regeneration dehumidifying rotor 14, the gas enters the adsorption zone 6 of the carbon dioxide adsorption rotor 5, thereby adsorbed its carbon dioxide in the carbon dioxide adsorption rotor 5 together with minutely remaining moisture. At this time, the amount of remaining moisture is so minute that it does not hinder adsorption of carbon dioxide much, resulting in an effective adsorption of carbon dioxide in the carbon dioxide adsorption rotor 5. After passage through the adsorption zone 6 of the carbon dioxide adsorption rotor 5, the gas enters, via the circulating route 26, to the cooling coil 27, resulting in being cooled so that the adsorption heat is removed. After passage through the cooling coil 27, the gas enters again into the adsorption zone 6 of the carbon dioxide rotor 5, and its carbon dioxide is adsorbed there. In this way, in this third embodiment of application of the present invention, the gas enters twice in the adsorption zone 6 of the carbon dioxide rotor 5.

Carbon dioxide is adsorbed in the adsorption zone 6 of the carbon dioxide rotor 5, and it moves to the desorption zone 21. Toward this desorption zone 21 is sent water vapor from the water vapor generator 22. The type A silica gel or synthetic zeolite wash-coated in the carbon dioxide rotor 5 has a stronger desorbing effect on water vapor than on carbon dioxide. As a result, the adsorbed carbon dioxide is released, and water vapor is adsorbed instead. For this reason, carbon dioxide is released in a very densified condition at the exit side of the adsorption zone 21 together with the excessive amount of water vapor. Thus densified carbon dioxide is processed so as to be buried in underground or in deep ocean. If necessary, a circulating path may be installed from the exit side to the inlet side of the desorption zone 21.

After passage through the adsorption rotor zone 6 of the carbon dioxide adsorption rotor 5, the gas passes through the purge zone 18 of the carbon dioxide adsorption rotor 5, its temperature being raised there, and is heated further by the heater 19. Then, the gas enters the desorption zone 20 of the carbon dioxide adsorption rotor 5. By this process, water vapor adsorbed in the carbon dioxide adsorption rotor 5 is desorbed by replacing carbon dioxide there. Because this desorbed water vapor contains little carbon dioxide, it is released to outside atmosphere.

[Fourth Embodiment]

Figure 4:
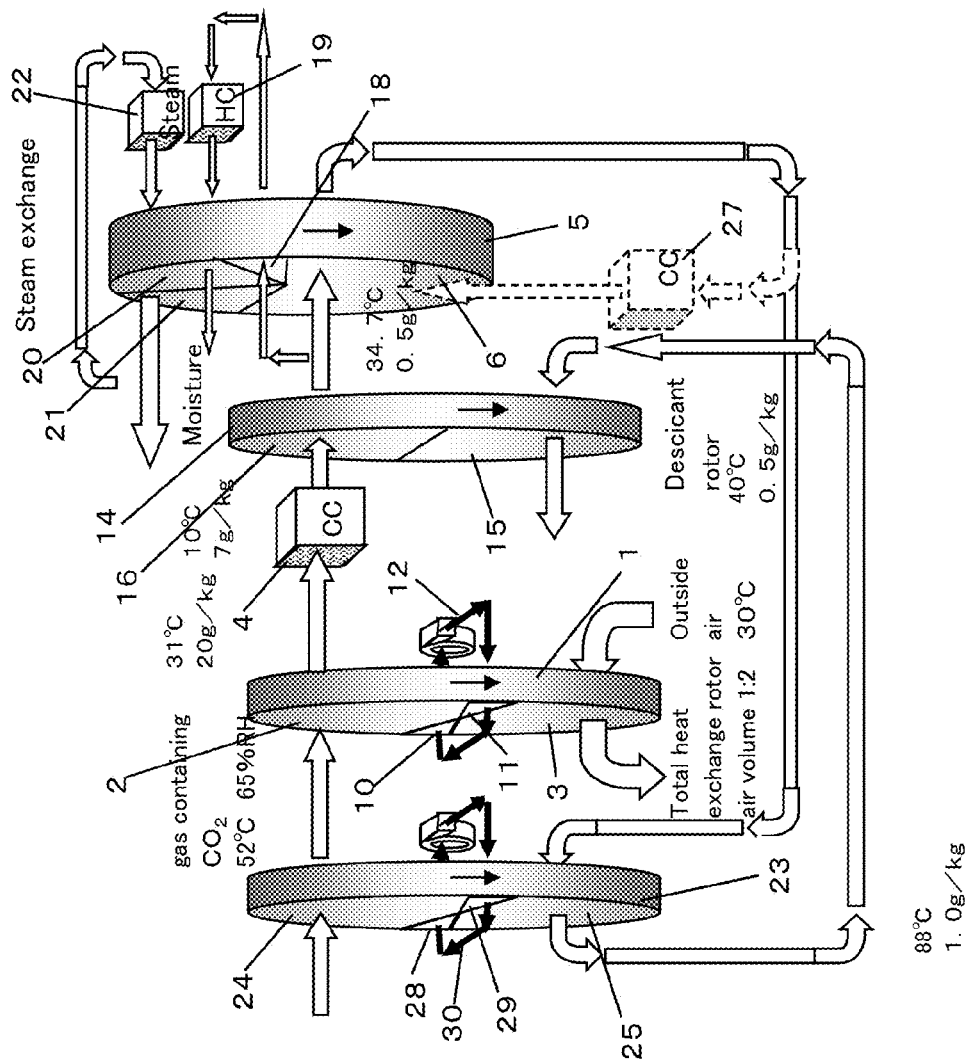
FIG. 4 shows a gas flow in forth embodiment of the invention.

The fourth embodiment of application of the present invention is shown in FIG. 4. In this figure, the same components as those in FIGS. 1~3 for the first, second and the third embodiments of applications are given the same numbers. Compared with the third embodiment of application, the following points are different for the fourth embodiment. Firstly, the gas from thermal power plants does not heat-exchange with outside air using the sensible heat exchanger rotor 23, but does so with the gas which is removed of its carbon dioxide exiting from the adsorption zone 6 of the carbon dioxide adsorption rotor 5. Namely, all amount of the carbon dioxide removed gas is passed through the heat-expulsion zone 25 of the sensible heat exchanger rotor 23.

Then, thus temperature-raised and its carbon dioxide removed gas is sent to the desorption zone 15 of the low temperature regeneration dehumidifying rotor 14, thereby desorbing moisture adsorbed in the low temperature regeneration dehumidifying rotor 14. In this way, the moisture desorption adsorbed in the low temperature regeneration dehumidifying rotor 14 is carried out using the heat energy contained in the exhaust gas from thermal power plants, without using any other source of energy, resulting in much overall energy saving.

In the above explanation, all amount of the carbon dioxide removed gas exiting from the adsorption zone 6 of the carbon dioxide adsorption rotor 5 is sent to the heat-expulsion zone 25 of the sensible heat exchanger 23. However, as shown in the dotted line in FIG. 4, a portion of the carbon dioxide removed gas may be sent to the heat-expulsion zone 25 of the sensible heat exchanger 23, with the remaining portion returned to the adsorption zone 6 of the carbon dioxide adsorption rotor 5 after passage through the cooling coil 27. For this latter case, a portion of the gas exiting from the adsorption zone 8 of the carbon dioxide adsorption rotor 5 returns to the adsorption zone 6 with its adsorption heat being removed, resulting in having thinner density of carbon dioxide exiting from the adsorption zone 6.

Figure 5:
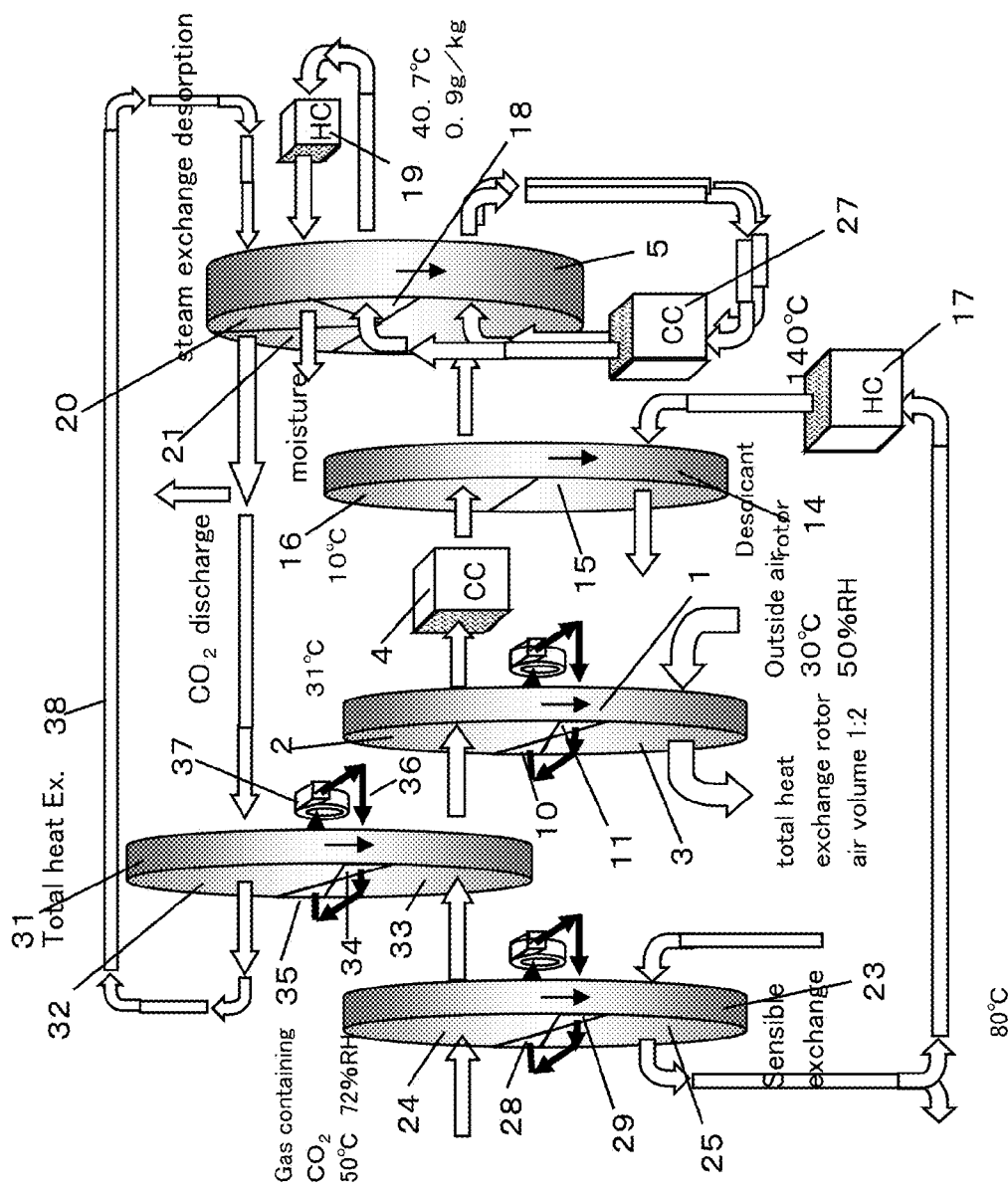
FIG. 5 shows a gas flow in fifth embodiment of the invention.

The fifth embodiment of application of the present invention is shown in FIG. 5. In this figure, the same components as those in FIGS. 1 to 4 for the first, second, the third and the fourth embodiments of applications are given the same numbers. Compared with the fourth embodiment of application, the fifth embodiment is different in the following points. The second total heat exchanger rotor 31 is added, with its upper half being the desorption zone 32 and the lower half being the adsorption zone 33. The second total heat exchanger rotor 31 has, similarly as for the case of the first all hear exchanger rotor 1, the two purge zones 34 and 35, with both the two purge zones 34 and 35 being circularly connected by the duct 36. In addition, the gas in the two purge zones 34 and 35, and the duct 36 is circulated using the circulation blower 37

Through the adsorption zone 33 of the second total heat exchanger rotor 31 is sent the gas after passage of the adsorption zone 24 of the sensible heat exchanger rotor 23, while the desorption zone 32 of the second total heat exchanger rotor 31 constitutes a circulating route 38 with the desorption zone 21 of the carbon dioxide adsorption rotor 5. At some point in the circulating route 38 is installed a blower for gas circulation, but the blower is not shown in the figure. Also, a water vapor generator 22 is not installed in this embodiment of application.

In this fifth embodiment of application which is arranged as described above, the exhaust gas from thermal power plants first passes through the adsorption zone 24 of the sensible heat exchanger rotor 23, thereby exchanging heat with the outside air which passes through the heat-expulsion zone 25 with the resultant lowering temperature of the exhaust gas. The outside air whose temperature is raised by the heat exchange process is further heated by passing through the heater 17, and enters into the desorption zone 15 of the low temperature regeneration dehumidifier rotor 14.

The exhaust gas whose temperature is lowered by passing through the sensible heat exchanger rotor 23 is sent to the adsorption zone 33 of the second total heat exchanger rotor 31, thereby its heat and moisture being removed. On the other hand, the gas which go through the desorption zone 32 of the second total heat exchanger rotor 31 is given heat and moisture there. The gas having thus added heat and moisture goes through the circulating route 38 and then passes through the desorption zone 21 of the carbon dioxide adsorption rotor 5. During this process, the heat and moisture in the gas enables the adsorbed carbon dioxide in the carbon dioxide adsorption rotor 5 to be exchanged with the gas.

The gas after passage through the desorption zone 21 of the carbon dioxide adsorption rotor 5 has a high density carbon dioxide, and some portion of it is sent to the carbon dioxide handling facility, with the remaining portion being returned again to the desorption zone 32 of the second total heat exchanger rotor 31.

In this fifth embodiment of application, among the heat energy contained in an exhaust gas, the sensible heat is used for desorption of the low temperature regeneration rotor 14, while the latent heat is used for desorption of the carbon dioxide adsorption rotor 5, resulting in a very efficient energy use.

The carbon dioxide remove system based on the present invention enables densification of carbon dioxide with the use of small amount of energy, together with the capability of the densification of carbon dioxide containing a large amount of moisture. Because of this characteristics, this system is suitable for densification and removal of carbon dioxide from exhaust gases such as from thermal power plants.

DESCRIPTION OF REFERENCE NUMBERS

1: total heat exchanger rotor
2: adsorption zone
3: desorption zone
4: cooling coil
5: carbon dioxide adsorption rotor
6: adsorption zone
7: desorption zone
8: purge zone
9: heat exchanger
10: purge zone
11: purge zone
12 duct
13: circulation blower
14: low temperature regeneration dehumidifying rotor
15: desorption zone
16: adsorption zone
17: heater
18: purge zone 19: heater
20: desorption zone
24: desorption zone
22: water vapor generator
23: sensible heat exchanger rotor
24: heat absorption zone
25: heat expulsion zone
26: circulating route
27: cooling coil
28 purge zone
29: purge zone
30: piping
31: second total heat exchanger rotor
32: desorption zone
33: adsorption zone
34: purge zone
35: purge zone
36: duct
37: circulation blower
38: circulation route The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A carbon dioxide removal system comprising:
    a total heat exchanger having adsorption and desorption zones, the adsorption zone configured to receive, cool and dehumidify exhaust gas from a fossil-fuel burning furnace and produce a dehumidified exhaust gas; and
    a carbon dioxide adsorption rotor having adsorption and desorption zones,
        the adsorption zone of the carbon dioxide adsorption rotor configured to remove carbon dioxide from the dehumidified exhaust gas and produce a cleaned gas, which is then sent through the desorption zone of the total heat exchanger for desorption of moisture from the total heat exchanger before being exhausted to outside atmosphere,
        the desorption zone of the carbon dioxide adsorption rotor being desorbed of carbon dioxide using water vapor, and
        the desorption zone of the carbon dioxide adsorption rotor producing very humid carbon dioxide to be sent to a processing system such as for underground burial,
    the system configured such that
        the resultant gas after passage through the total heat exchanger is sent to a dehumidifying rotor, and then sent to the carbon dioxide adsorption rotor, and
        a portion of the resultant gas after passage through the dehumidifying rotor is sent to a purge zone of the carbon dioxide adsorption rotor, and is then heated and sent through the desorption zone of the carbon dioxide adsorption rotor.

2. The carbon dioxide removal system described in claim 1, configured such that the dehumidified gas after passage through the total heat exchanger is further lowered of its temperature using a cooling equipment and is then sent to the carbon dioxide adsorption rotor.

3. The carbon dioxide removal system described in claim 1, wherein the total heat exchanger is a total heat exchange rotor with a pair of purge zones between its adsorption zone and desorption zone, and a duct is formed to circulate gas between the pair of purge zones.

4. The carbon dioxide removal system described in claim 1, wherein the carbon dioxide adsorption rotor has first and second desorption zones, with the first desorption zone being desorbed using water vapor while the second desorption zone being desorbed using heat.

* * * * *